United States Patent Office 2,750,537
Patented June 12, 1956

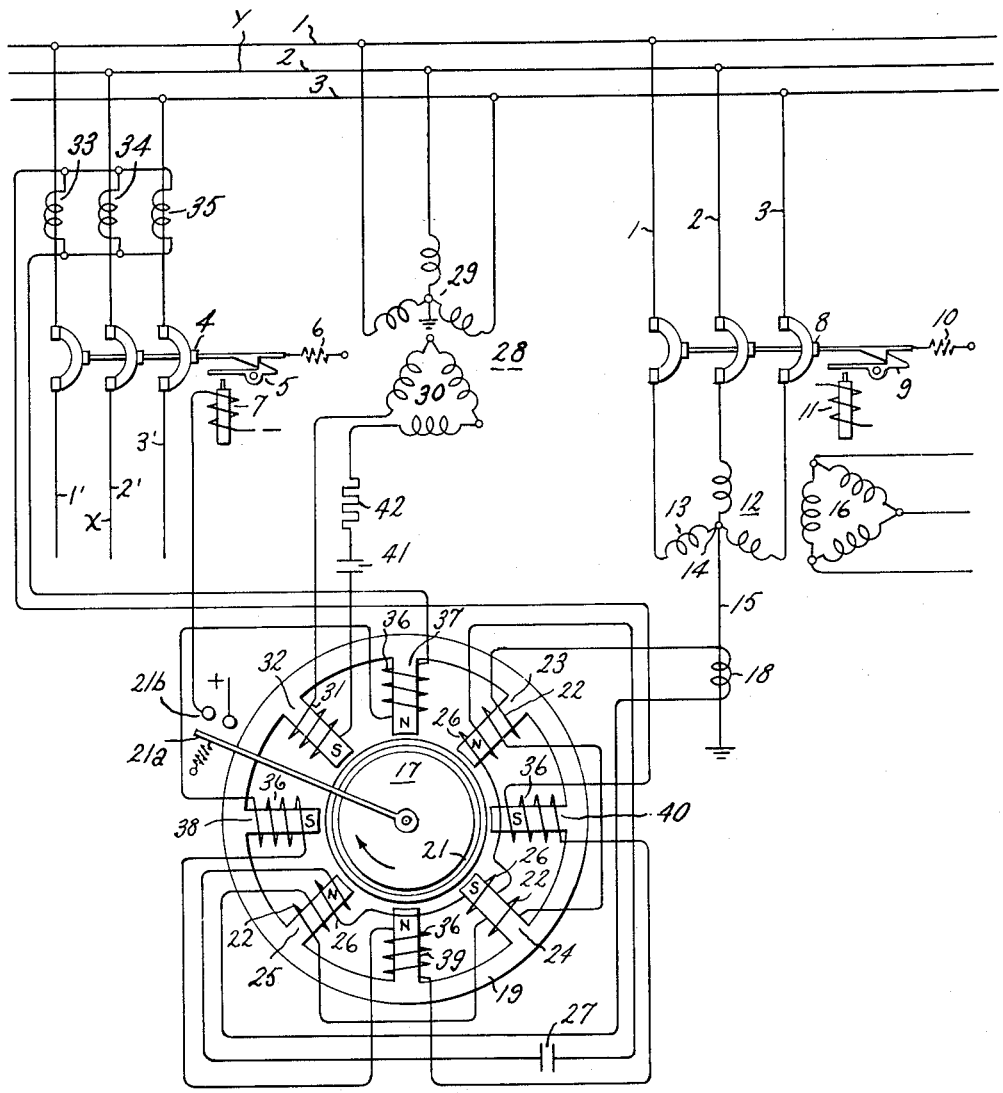

2,750,537

DIRECTIONAL GROUND RELAY WITH DUAL POLARIZATION MEANS

William C. Morris, Havertown, Pa., assignor to General Electric Company, a corporation of New York Application May 13, 1952, Serial No. 287,546

3 Claims. (Cl. 317—36)

This invention relates to directional ground relays and the principal object is to provide dual polarization means for a ground directional relay of the multiple type such as disclosed in U. S. Patent 2,110,676—Prince, granted March 8, 1938, and assigned to the assignee of this invention.

One form of a conventional directional ground relay comprises a movable induction member such as a metallic disk or cup mounted for rotation by an electromagnetic means such as a multiple pole magnetic member having windings thereon for imparting motion to the conducting member. Such a relay is directional since the resultant torque produced on the induction disk or cup member is due to the interaction of the currents induced therein with the fluxes produced by the currents flowing in the windings of the multiple pole magnetic member. Two energizing quantities are supplied to the electromagnetic means such as a reference or polarizing quantity supplied to one winding and another quantity supplied to a different winding and which is indicative of the direction in which a fault is located in the system relative to the location of the relay. Thus if the fault is in one direction relative to the relay, the indicating quantity will bear one torque producing relationship to the reference quantity. If, however, the fault is in the opposite direction from the relay, then the indicating quantity will bear an opposite torque producing relationship to the reference quantity. In this way, the relay is capable of determining the direction of the ground fault relative to the relay in a manner which is well known in the art and such as is disclosed in the above-mentioned Prince Patent 2,110,676. According to present practice, the reference quantity supplied to one of the relay windings, commonly referred to as a polarizing current, is derived from a current transformer having its primary winding connected between ground and the neutral of a power transformer in the station where the relays are located. On the other hand, a reference quantity may be derived from an open corner of a broken delta or mesh connected secondary winding of a three phase potential transformer having its primary winding connected in grounded star and energized from the station bus or incoming line. Such a reference quantity is commonly referred to as a polarizing voltage and the relay is said to be voltage polarized.

Often the arrangement of circuits and the operating procedures common to a particular station are such that one or the other of the above-mentioned sources of reference or polarizing quantities may at times be disconnected from the system. Therefore, it has been necessary to install two separate relays, one of which is polarized with current and the other of which is polarized with voltage in order to provide effective relay protection in case the energization of either of the polarizing means should fail or be rendered ineffective.

The present invention enables the same results to be obtained by means of a single relay unit of the ground directional type with two polarizing means.

Another object of the present invention is to provide a multipole directional-ground relay with improved complementary polarization windings energized respectively by electrical reference quantities that vary as inverse and direct functions of the "local ground impedance" and coordinated in selective torque producing relation with the ground fault current responsive operating winding to enable the relay to respond effectively to distant ground faults in a predetermined direction even though the value of the "local ground impedance" may be varied over a wide range.

According to this invention, a relay of the ground directional type having a movable induction member and a stationary electromagnetic means is provided with a plurality of poles adapted to form a portion of the magnetic circuit of a plurality of windings, one of the windings being energized by a reference or polarizing quantity dependent upon the system voltage, another of the windings being energized by a reference or polarizing quantity dependent upon the system current and still another of the windings being energized by an indicating quantity whose relationship to both of the reference or polarizing quantities is dependent upon the direction in which a ground fault in the system occurs relative to the location of the relay. Thus a ground directional relay embodying the improvements of the present invention has a desirable operating characteristic that cannot be obtained by using either voltage polarization or current polarization alone. This desirable operating characteristic is that the improved dual polarization ground directional relay has almost a constant sensitivity regardless of the value of "local ground source impedance."

The invention will be better understood from the following description when considered in connection with the accompanying drawing which is a diagrammatic representation of an electric system incorporating a relay having dual polarizing or reference windings in accordance with this invention.

In the drawing, the numerals 1, 2, and 3 represent the local station bus conductors of a three phase transmission system that usually will have various three-phase power supply circuits as well as three-phase load circuits interconnected therewith at other stations, not shown. Connecting the station bus conductors 1, 2 and 3 with the transmission line comprising the conductors 1', 2' and 3' that may have interconnected therewith both three-phase power supply circuits and three-phase load circuits at some distant station, is a schematically represented circuit breaker 4 having a latch mechanism 5 which normally maintains the circuit breaker in the closed position against the action of a spring 6 which biases the circuit breaker toward the open position. The latch 5 may be tripped by means of the electromagnetic device schematically indicated at 7.

Also connected to the local station bus conductors 1, 2 and 3 is another circuit breaker schematically represented at 8. Circuit breaker 8 is provided with a latch mechanism 9 which holds the breaker closed against the action of spring means 10. Circuit breaker 8 opens when latch 9 is tripped by electromagnetic tripping device 11, thus disconnecting the station power transformer designated by the numeral 12 from the local station bus conductors. This transformer is provided with a star connected winding 13 having its neutral 14 grounded through a conductor 15. Transformer 12 is also provided with a mesh connected winding 16 that may have interconnected therewith both three-phase power supply circuits and three-phase load circuits at distant stations.

One source of a reference or polarizing quantity for the ground directional relay generally designated by the numeral 17 comprises the current transformer 18 having its primary winding in series with the ground conductor 15.

The relay unit 17 is provided with stationary electromagnetic member 19 having a plurality of salients on each of which is wound a coil. Selectively rotatable within the electromagnetic member 19 is the induction member 21 which may be a disk or a cup-shaped member and with which is rotatable a contact arm 21a which in turn is arranged to actuate the device 7 by closing contacts 21b to open the breaker 4 when the induction member 21 is rotated in a clockwise direction.

Current for polarizing relay 17 is supplied by the transformer 18 as already explained. In this connection, it will be observed that coil 22 is wound about the salients 23, 24 and 25 to provide the same magnetizing polarity on salients 23 and 25 and the opposite magnetizing polarity on the intermediate salient 24, and that this winding is energized from the secondary winding of the current transformer 18.

For the purpose of establishing the usual and well known phase shift between the operating and polarizing fluxes of the ground direction relay in a manner to produce operating or restraining torque in the induction disk or cup-shaped member 21, a winding 26 is mounted on the salients 23, 24 and 25 in inductive relation with the winding 22 and is arranged in series with a capacitor 27 for the purpose of effecting the desired phase shift between the flux produced by the current polarizing winding 22 and the flux produced by the operating winding 36.

Another reference or polarizing quantity is derived from the system voltage by means of the potential transformer generally designated by the numeral 28. Transformer 28 is provided with a star connected primary winding 29 and a delta or mesh connected secondary winding 30 which, as indicated in the drawing, is open at one corner thereof so as to provide a source of energy for the reference winding 31 which is wound on the salient 32.

Thus if switching operations are effected in such a way as to de-energize the current transformer 18 or the potential transformer 28 or in the event that either of these devices should fail, there would be a reserve device in readiness to supply a polarizing quantity to the relay 17. Of course, the relay 17 will always operate on both quantities jointly in response to distant faults when both are simultaneously supplied. The relative magnitude of the relay potential polarization for distant faults inherently will vary as a direct function of the "local ground impedance," i. e., the impedance from the station bus through transformer 12 to ground, while the relative magnitude of the relay current polarization for distant faults inherently will vary as an inverse function of the "local ground impedance." Thus, when the relay is provided with the improved dual complementary polarization, one varying as an inverse function and the other varying as a direct function of the "local ground impedance," the relay can operate effectively in any station in response to distant ground faults whether the "local ground impedance" is either high or low.

A quantity whose relationship to the above-mentioned reference quantities is dependent upon the direction of a fault relative to the relay location is also supplied to the relay 17. To this end a plurality of current transformers 33, 34, and 35 are respectively connected to be energized by the conductors 1, 2, and 3. These transformers are arranged in the usual parallel manner to supply current having a polarity dependent upon the direction of the ground fault and a magnitude proportional to the ground current to the operating winding 36 which is wound on the salients 37, 38, 39, and 40. As shown, winding 36 provides alternate polar magnetization for the salients of an alternating character and having a coordinated progressive polar relationship with the magnetization polarities of the adjacent salients to effect selective ground fault directional operation of the relay contact 21a. Such relationship existing at a particular instant to produce an operating torque in the contact closing direction is indicated by the respective salient N S designations in the drawing if it is also understood that the maximum alternating magnetization of adjacent poles of the same polarity is progressing clockwise and that all polarities as indicated will necessarily become reversed in the next half cycle as well known in the art. Thus if a fault occurs on conductor 2 at the place designated by the letter X then the direction of current through the transformer 34 is different than the direction of current through this transformer should a fault occur on conductor 2 at the place designated by the letter Y although the reference quantities supplied by the transformers 28 and 18 remain unaffected. Thus, the contact arm 21a is arranged so as to close contacts 21b when a fault occurs at point X whereas the torque exerted on the conducting member 21 is such that when a fault occurs at point Y the member 21 tends to rotate in the counterclockwise direction thereby tending to prevent closure of the contacts 21b. The relay is, therefore, directional in character and operates according to known principles which are fully explained in the previously mentioned Prince Patent 2,110,676.

In order to obtain the desired progressive salient polarity relationship between the reference or polarizing winding 31 and the other windings, it may be necessary to add a capacitor 41 and a resistor 42 of proper value in series with winding 31.

In view of the above description it will be understood that by my invention a single relay is provided with reference or polarizing quantities derived from both the system voltage and from a current from the connection leading from the neutral of a star connected power transformer and ground, and that by this construction it is necessary to use only one relay unit instead of two at any station where the "local ground impedance" is subject to wide variation due to switching procedures.

While I have shown and described a particular embodiment of the invention I do not wish to be limited thereto and intend in the appended claims to cover all such changes and modifications as fall within the true spirit and scope of the invention.

What I claim as new and desire to secure by Letters Patent of the United States is:

1. A ground directional relay for use in conjunction with a polyphase electric power system, said relay comprising a rotatable current induction member, electromagnetic means for selectively rotating said member in accordance with the magnitudes of and phase displacements between predetermined electrical quantities of the system, said electromagnetic means including a multipole magnetic member and a plurality of windings on said member, one of said windings having means for effecting energization thereof by a reference quantity dependent upon an electrical quantity of the system that varies as an inverse function of the local ground impedance, another of said windings having means for effecting energization thereof by another reference quantity dependent upon an electrical quantity of the system that varies as a direct function of the local ground impedance, and still another of said windings being arranged for energization by an electrical quantity of the system having a relationship to each of said reference quantities which is dependent upon the direction in which a ground fault in the system is located relative to the relay.

2. A ground directional relay for use in conjunction with a polyphase electric power system, said relay comprising a rotatable current induction member, electromagnetic means for selectively rotating said member in accordance with the magnitudes of and phase displacements between predetermined electrical quantities of the system, said electromagnetic means including a multipole magnetic member and a plurality of windings on said member, one of said windings having means for effecting energization thereof by a reference quantity dependent upon the system current, another of said windings having means for effecting energization thereof by another reference quantity dependent upon the system voltage, and still another of said windings having means for effecting energization thereof by an indicating quantity derived from the system and having a relationship to both said reference quantities which is dependent upon the direction in which a ground fault in the system is located relative to the relay.

3. In combination, a potential transformer having a star-connected primary winding with a grounded neutral and being energized from a polyphase electric power system and having its secondary winding connected in mesh, a power transformer having a star-connected winding and forming a componeut of the system, said star connected winding having the neutral thereof grounded, a current transformer having its primary winding connected in series with the neutral ground connection for said star-connected winding, a ground directional relay unit comprising a rotatable current induction member, and electromagnetic means for selectively rotating said member in accordance with the magnitudes of and phase displacements between predetermined electrical quantities of the system, said electromagnetic means including a multipole magnetic member and a plurality of windings on said member, one of said windings being connected across an open corner of said secondary winding of said potential transformer, another of said windings being energized from the secondary winding of said current transformer, and still another of said windings having means for effecting energization thereof by an indicating quantity derived from the system and having a relationship to the current in each of the other two windings which is dependent upon the direction in which a ground fault in the system is located relative to the relay.

References Cited in the file of this patent

UNITED STATES PATENTS

| | | |
|---|---|---|
| 2,020,972 | Starr | Nov. 12, 1935 |
| 2,098,035 | Fukushima | Nov. 2, 1937 |
| 2,110,676 | Prince | Mar. 8, 1938 |
| 2,130,573 | Wideroe | Sept. 20, 1938 |
| 2,246,310 | Lenehan | June 17, 1941 |
| 2,309,487 | Warrington | Jan. 26, 1943 |
| 2,315,469 | Warrington | Mar. 30, 1943 |
| 2,403,414 | Traver | July 2, 1946 |
| 2,501,346 | Mehring | Mar. 21, 1950 |
| 2,516,025 | Sonnemann | July 18, 1950 |
| 2,560,217 | Dewey | July 10, 1951 |